(12) United States Patent
Grozik

(10) Patent No.: US 6,553,710 B1
(45) Date of Patent: Apr. 29, 2003

(54) FLY ROD REEL SEAT BUTT PROTECTION DEVICE

(76) Inventor: Richard S. Grozik, 40 W931 Dillionfield Dr., Box 58, LaFox, IL (US) 60147

(*) Notice: Subject to any disclaimer, the term of this patent is extended or adjusted under 35 U.S.C. 154(b) by 0 days.

(21) Appl. No.: 10/196,029

(22) Filed: Jul. 16, 2002

Related U.S. Application Data

(63) Continuation of application No. 09/722,835, filed on Nov. 27, 2000.
(60) Provisional application No. 60/164,911, filed on Dec. 1, 1999.

(51) Int. Cl.⁷ .............................................. A01K 87/00
(52) U.S. Cl. .............................................. 43/23; 43/25
(58) Field of Search ....................... 43/23, 25, 21.2; D22/147; 224/922

(56) References Cited

U.S. PATENT DOCUMENTS

| | | | |
|---|---|---|---|
| 1,556,966 A | * | 10/1925 | Selig ............................. 43/23 |
| 2,997,042 A | * | 8/1961 | Mitchell ........................ 43/23 |
| 3,073,055 A | * | 1/1963 | Edwards et al. ............... 43/23 |
| 3,830,006 A | * | 8/1974 | Garbolino ...................... 43/23 |

FOREIGN PATENT DOCUMENTS

| | | | |
|---|---|---|---|
| FR | 1.473.295 | * 2/1967 | ..................... 43/23 |

* cited by examiner

Primary Examiner—Peter M. Poon
Assistant Examiner—Joan M. Olszewski
(74) Attorney, Agent, or Firm—John L. Schmitt

(57) ABSTRACT

A fly rod reel seat butt protection device is comprised of a rubber body resiliently expandable for covering and conforming to shafts and rimmed butts of fly rod reel seats. The body has an axial bore at its front end and a conical exterior surface convergently tapering from the front end to a domed-shaped rear. An annular ridge and an inwardly projecting annular recess are formed about the conical interior surface of the body for receiving and attaching to an annular rim of the fly rod reel seat butt.

2 Claims, 1 Drawing Sheet

FLY ROD REEL SEAT BUTT PROTECTION DEVICE

CROSS REFERENCE TO RELATED APPLICATIONS

This application is a continuation application of application Ser. No. 09/722,835 filed Nov. 27, 2000, that in turn was a continuation-in-part of U.S. Provisional patent No. 60/164, 911 filed Dec. 1, 1999.

BACKGROUND OF THE INVENTION

1. Field of the Invention

The present invention generally relates to devices for fishing rods butts, more particularly is concerned with an attachable/detachable reel seat butt protection device for use by persons active in fly fishing.

2. Description of the Prior Art

Areas that are potentially harmful to fly rod reel seat butts are common in a number of diverse settings, for example, during fly rod assembly, storage, transport, line rigging and while in use on or about the bank, shore, dock or boat. Several approaches have been proposed in the prior art to protect fishing rod butts.

One approach to fishing rod butt protection is the provision of an expandable, cup-shaped member mounted for covering the butt end of the fishing rod. The main drawback of the cup approach to fishing rod butt protection is its inability to provide secure attachments to the rimmed butts of fly rod reel seats. Examples of such approaches are illustrated and described in U.S. Pat. No. 831,150 to Fraser, U.S. Pat. No. 1,556,966 to Selig, and U.S. Pat. No. 2,144, 122 to Pflueger.

The provision of the cup-shaped device for fishing rod butt protection is believed to be the preferred one. However, none of the devices of the cited prior art patent references is felt to represent a particularly desirable nor highly satisfactory solution to the problem of how best to protect the rimmed butts of fly rod reel seats.

Consequently, a need remains unfilled for an improved approach for protecting the rimmed butts of fly rod reel seats.

SUMMARY OF THE INVENTION

The present invention provides a fly rod butt protection device designed to satisfy the aforementioned need. The fly rod reel seat butt protection device of the present invention meets the fly rod seat butt protection requirements and needs of both freshwater and saltwater fly fishing anglers.

The fly rod reel seat butt protection device gives users the option of attaching or detaching the device as needed for fly rod assembly, storage, transport, line rigging or fish-fighting leverage.

The fly rod reel seat butt protection device is a resiliently expandable body comformable to the shafts and rimmed butts of fly rod reel seats. The body has rear and front ends, a bore formed in the front end, an interior annular ridge and recess, and an exterior surface tapering convergently from the front to the dome-shaped rear end.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
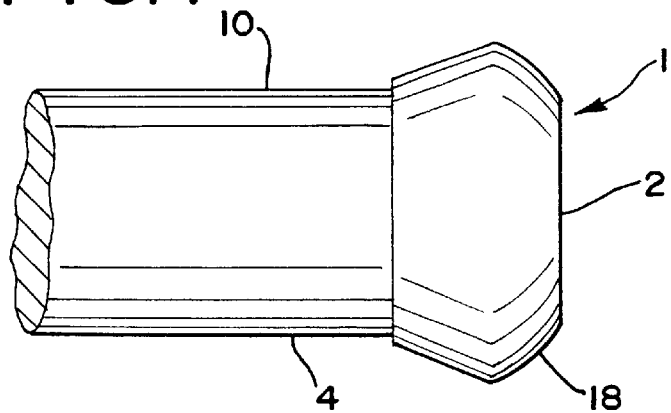
FIG. 1 is an enlarged perspective side view of the fly rod butt having a protective device of the present invention attached to the shaft and rimmed butt of a fly rod reel seat.
Figure 2:
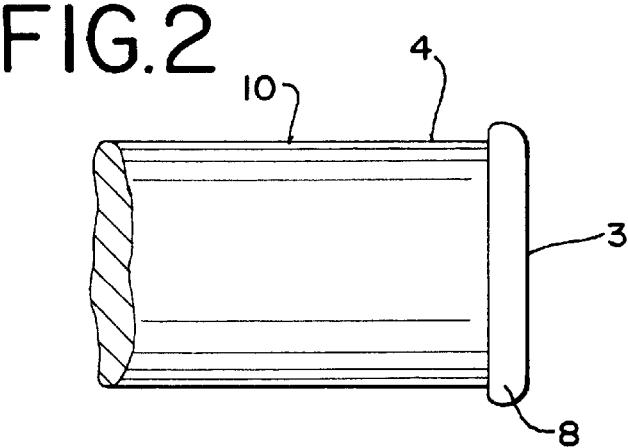
FIG. 2 is an enlarged perspective side view of the shaft and rimmed butt of a fly rod reel seat.
Figure 3:
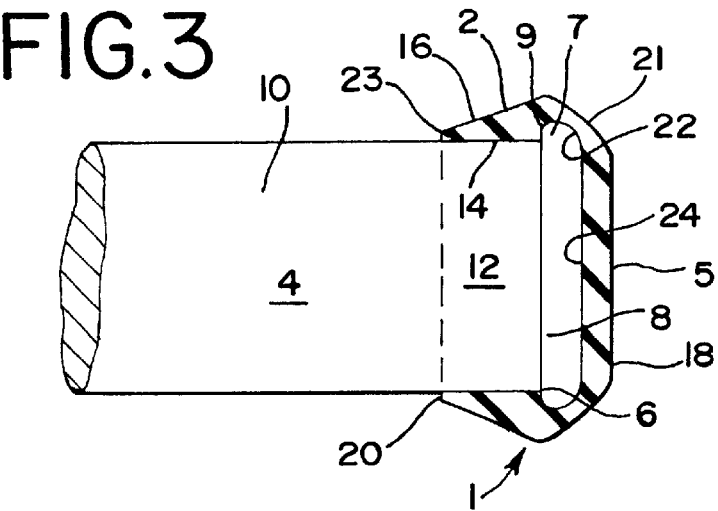
FIG. 3 is an enlarged cross-sectional side view of the present invention attached to the shaft and rimmed butt of a fly rod reel seat.

Referring to the drawings, and particularly to FIGS. 1 and 3, there is shown a fly rod reel seat butt protection device 1 in accordance with this invention. More particularly, referring to FIGS. 1, 2 and 3, the device 1 for the protection of a rimmed butt 3 of a fly rod reel seat 10 has a resiliently expandable body 2. This body 2 is conformable to a shaft 4, the rimmed butt 3 and an annular rim 8 of the rim butt 3 of the reel seat 10. Preferably, the body 2 is composed of a durable water-resistant rubber material. The protection device body 2 from a front end 20 and extending rearward has, in cross-section, a tapered shape and a bore 12 having a cylindrical interior surface 14 adapted to fit over a sidewall of the fly rod reel seat shaft 4. An exterior surface 16 of the device front end 20 is outwardly and upwardly inclined.

Also, the body 2 has a rear end 18 having a domed-shaped exterior surface 5 to cover an end face of the fly rod reel seat rimmed butt 3. Referring now to FIG. 3, the bore 12 in the body front end 20 extends inward toward the device rear end 18 to intersect with a laterally extending inner annular ridge 6 of an annular recess 7. An outer end 9 of the ridge 6 then intersects with an interior concave-shaped sidewall 22 of the recess 7. This sidewall 22 then connects with an inner surface 24 of the domed-shaped rear end 18 of the device body 2. Note that a cross-sectional thickness 21 of the sidewall 22 thins to proximately equal a cross-sectional thickness 23 of the front end 20 of the body 2. The bore 12 and annular recess 7 are adapted to receive the shaft 4 and rimmed butt 3 of the fly rod reel seat 10. The body 2 can be compression or injected molded from expandable rubber, silicone or plastic material as a one-piece structure.

It is thought that the present invention will be understood from the foregoing description, and it will be apparent that various changes may be made thereto without departing from its spirit and scope or sacrificing all its material advantages, the form hereinbefore described preferred or exemplary embodiment thereof.

What I claim is:

1. A fly rod seat butt protection device comprising:

a resiliently expandable body conformable to a shaft and rimmed butt of a fly rod reel seat, said body having a front and a rear end, a cylindrical bore formed in said body, and an exterior surface of said body from said front end tapering outwardly and convergent with a domed-shaped exterior surface of said rear end, said bore having an interior diameter smaller than said reel seat shaft and said rimmed butt, and said bore extending rearward to intersect with a substantially perpendicularly positioned, outward extending inner annular ridge forming part of an annular recess with an outer end of said ridge connecting with an inner concave sidewall defining part of an inner surface of said rear end of said body, wherein said device may releasably fit over said fly rod reel seat with said shaft and said rimmed butt of said reel seat being compressively secured respectively in said bore and said annular recess of said device.

2. A protective device as defined by claim 1 and further characterized by, a cross-sectional thickness of said sidewall from the point where said dome-shaped surface begins decreases in thickness such that said cross-sectional thickness of said sidewall of said rear end of said body proximately equals a cross-sectional thickness of said front end of said body, wherein said body may expand during insertion of said shaft and said rimmed butt of said fly rod reel seat.

* * * * *